Figure 1:
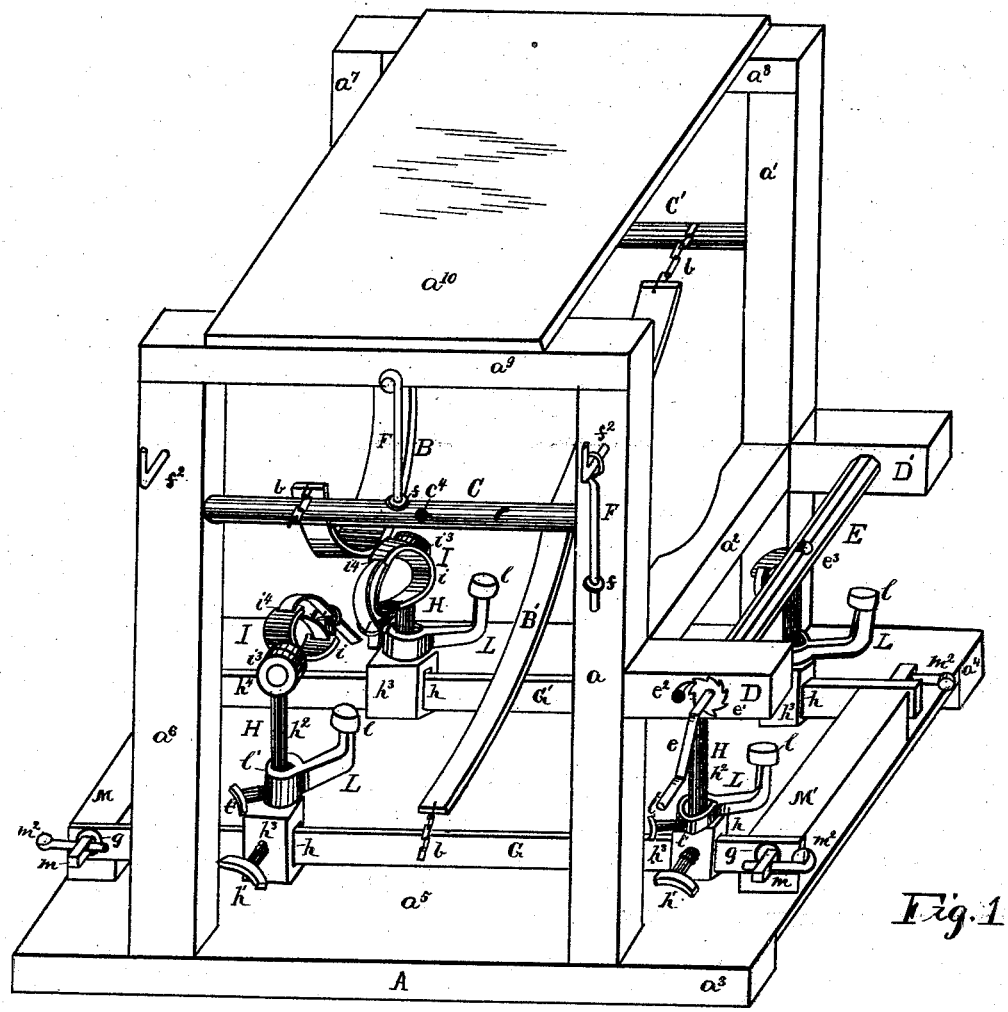

(No Model.)

T. P. McCREIGHT.
DEVICE FOR HOLDING ANIMALS TO BE SHOD..

No. 316,558. Patented Apr. 28, 1885.

Witnesses.
G. A. Haseltine
M. L. Haseltine

Inventor.
Thomas P. McCreight
By Seward A. Haseltine,
Attorney.

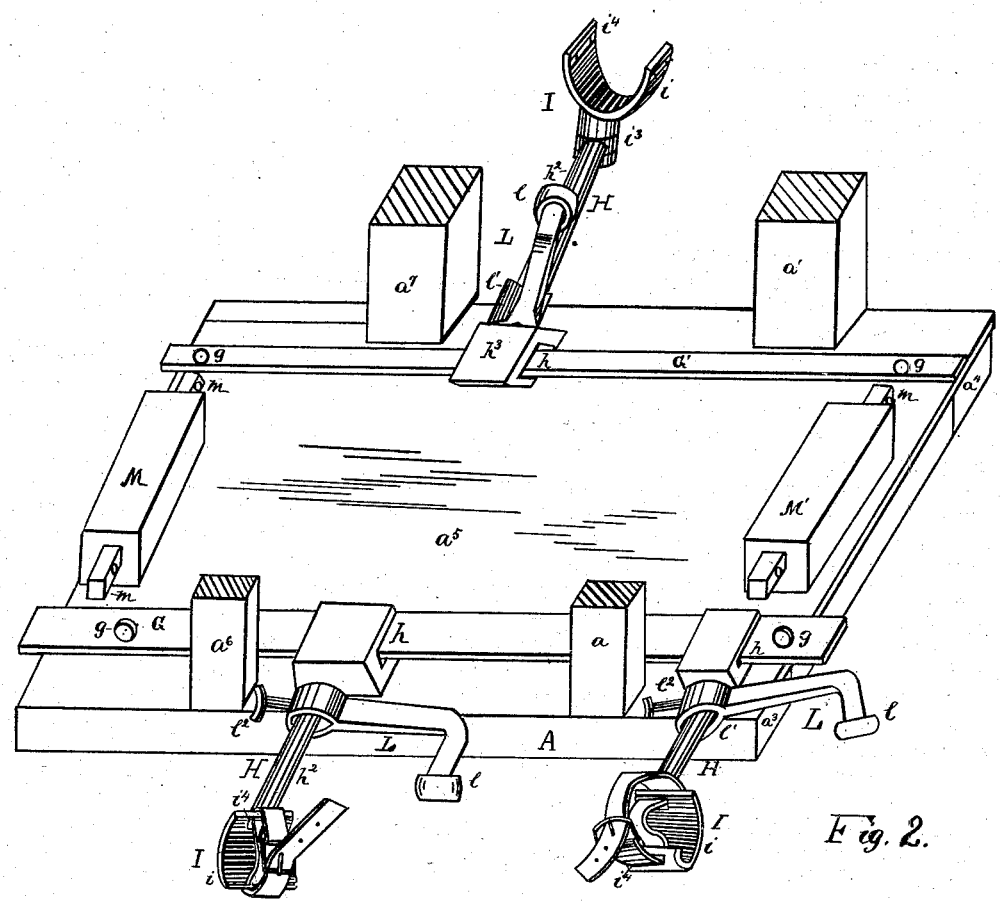

United States Patent Office.

THOMAS P. McCREIGHT, OF BRINKLEY, ARKANSAS.

DEVICE FOR HOLDING ANIMALS TO BE SHOD.

SPECIFICATION forming part of Letters Patent No. 316,558, dated April 28, 1885.

Application filed September 29, 1884. (No model.)

*To all whom it may concern:*

Be it known that I, THOMAS P. McCREIGHT, a citizen of the United States, residing at Brinkley, in the county of Monroe and State of Arkansas, have invented certain new and useful Improvements in Devices for Holding Animals to be Shod; and I do hereby declare the following to be a full, clear, and exact description of the invention, such as will enable others skilled in the art to which it appertains to make and use the same.

My invention relates to improvements in devices for holding mules, horses, oxen, &c., while being shod, the object of which is to provide a cheap, simple, convenient, strong, and durable device for holding the feet of the animal to be shod in an easy position for nailing the shoe, and then changed to an easy position for clinching the nails and dressing the hoof. These objects I attain by means of the device illustrated in the accompanying drawings, forming a part of this specification, in which—

Figure 1 is a view in elevation of the entire device. Fig. 2 is a detailed view.

Similar letters indicate corresponding parts in both the figures.

A is an ordinary frame-work resting upon sills $a^3$ $a^4$, which are preferably covered with a floor, $a^5$. Said frame is composed of the uprights $a$ $a'$ $a^6$ $a^7$, cross-pieces $a^9$ $a^8$, and a cap, $a^{10}$, and is provided with the usual bands, B B', which have links $b$, to engage hooks or catches on rollers C C', for raising the animal from the floor.

F are levers, having a ring or enlargement, $f$. Said levers are made long enough so that when in the holes $c^4$ up to the enlargement the upper end will catch on the cap or cross-piece, as shown. When not in use, said levers may be hung on hooks $f^2$.

E is a roller, having a crank, $e$, and a ring, $e^3$, in which to hitch the halter of the animal to be shod. Said roller is supported by arms D D', and is preferably provided with a wheel, $e'$, firmly secured to the roller, and having a ratchet-catch, $e^2$, to prevent the roller from turning back.

G G' are bars, having holes $g$, to receive the pins $m$ of end blocks, M M'. These bars are easily attached and detached by removing or placing the keys $m^2$.

H are posts secured to the bars so as to slip back and forth. For this purpose they are provided with a hole, $h$, in the lower end, $h^3$, which is large enough to receive the bar. $h'$ is a thumb-screw, which permits the post to slide when desired, and secures it in any desired place when screwed in against the bar. $h^2$ is the shaft of said post, which is preferably made round, and at its upper end is a suitable attachment for a cuff, preferably by means of a hole, $h^4$.

I is a cuff to receive the ankle of the animal. It is attached to the upper end of the post so as to turn. For this purpose it is provided with a bolt to enter the hole $h^4$, to form a swivel at $i^3$. The part $i$ is preferably made of iron, and padded to prevent injury. In the ends are holes $i^4$, to receive a strap for buckling around the leg. L is a support having a ball, $l$, on which to rest the foot in clinching the nails and dressing the hoof. Said support is secured to the post so as to move up and down. For this purpose it is provided with a sleeve, $l'$, and has a thumb-screw, $l^2$, for fastening it in any desired place. This support is also free to turn from side to side around the post.

The device is operated thus: The keys are removed and the bars laid to the sides out of the way, the bands detached at one end, and the device is ready to receive the animal. The rope of the animal, being attached to the roller E, is drawn until the breast rests against the piece $a^2$. It is then raised from the floor by the bands and rollers, the last lever being left in the hole to support the animal. The bars are replaced and keyed in position. The feet are then secured in the cuffs. The smith moves the post to the desired point for nailing the shoe and secures it by the thumb-screw $h'$. Meanwhile the support is dropped and turned out of the way. This accomplished, the post is pushed forward as desired by the smith and the support raised until the ball $l$ supports the foot, when it is stayed by the set-screw $l^2$, which gives a firm support for clinching the nails and dressing the hoof, the ankle all the while remaining in the cuff, which turns to admit the post to slide, as stated. The animal being shod, the cuffs are loosened and the bars unkeyed and removed. The animal may then be let down and backed out.

This device is portable, and is a convenient as well as safe means of shoeing wild or ugly mules, oxen, horses, and other animals.

Having thus described the construction, use, and operation of my invention, what I claim as new, and desire to secure by Letters Patent, is—

1. A device for adjustably holding the feet of animals to be shod, comprising end pieces, M M′, bars G G′, sliding posts H, having set-screw $h'$, swiveled cuffs I, and support L, having a ball, $l$, the parts being combined substantially as shown and described.

2. In a device for holding animals to be shod, bars G G′, sliding posts H, having holes $h$, to receive the bars, and thumb-screws $h'$, to secure the same where desired, said posts having swiveled cuffs I and movable support L, the parts being combined substantially as and for the purpose set forth.

3. The combination of a post, H, having a hole, $h$, thumb-screw $h'$, rounded shaft $h^2$, a cuff, I, having swivel connection with said shaft, and a support, L, having a sleeve, $l'$, to receive the said shaft, and a thumb-screw, $l^2$, and ball $l$, substantially as shown and described.

4. A device for securing and raising animals, composed of a frame, A, bands B B′, rollers C C′, levers F, and roller E, combined with a device for securing the feet of said animal, composed of end pieces, M M′, bars G G′, sliding posts H, which have thumb-screws $h'$, cuffs I, swiveled to said posts, and support L, which has a ball, $l$, sleeve $l'$, and set-screw $l^2$, substantially as shown and described, for the purpose set forth.

In testimony whereof I affix my signature in presence of two witnesses.

THOMAS P. McCREIGHT.

Witnesses:
 HYLIARD A. CARTER,
 SAM P. MOORE.